United States Patent
Chuah et al.

(10) Patent No.: US 7,096,039 B2
(45) Date of Patent: Aug. 22, 2006

(54) BACKHAUL MULTICASTING USING ETHERNET-BASED RADIO ACCESS NETWORKS

(75) Inventors: Mooi Choo Chuah, Marlboro, NJ (US); Enrique Hernandez-Valencia, Highlands, NJ (US); Wing Cheong Lau, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 279 days.

(21) Appl. No.: 10/185,993

(22) Filed: Jun. 28, 2002

(65) Prior Publication Data

US 2004/0002362 A1  Jan. 1, 2004

(51) Int. Cl.
*H04M 1/00* (2006.01)

(52) U.S. Cl. ............... 455/561; 455/503; 455/456.5

(58) Field of Classification Search ............ 455/501, 455/502, 516, 422, 560, 503, 436, 31.3, 525, 455/456.5, 456.1, 423, 67.1, 562, 561; 370/395, 370/437, 347, 386; 709/238, 227
See application file for complete search history.

(56) References Cited

U.S. PATENT DOCUMENTS

| | | | | |
|---|---|---|---|---|
| 5,594,718 | A  * | 1/1997  | Weaver et al. | 370/331 |
| 5,878,352 | A  * | 3/1999  | Souissi et al. | 455/503 |
| 5,940,741 | A  * | 8/1999  | Briancon et al. | 340/7.22 |
| 6,167,272 | A  * | 12/2000 | Hellstern | 455/446 |
| 6,192,250 | B1 * | 2/2001  | Buskens et al. | 455/463 |
| 6,243,758 | B1 * | 6/2001  | Okanoue | 709/238 |
| 6,247,059 | B1 * | 6/2001  | Johnson et al. | 709/237 |
| 6,337,863 | B1 * | 1/2002  | Nair et al. | 370/395.53 |
| 6,370,127 | B1 * | 4/2002  | Daraiseh et al. | 370/328 |
| 6,434,396 | B1 * | 8/2002  | Rune | 455/502 |
| 6,483,818 | B1 * | 11/2002 | Ohno et al. | 370/328 |
| 6,697,349 | B1 * | 2/2004  | Mathis et al. | 370/338 |
| 6,973,053 | B1 * | 12/2005 | Passman et al. | 370/310 |
| 2003/0016648 | A1 * | 1/2003 | Lindsay et al. | 370/347 |

(Continued)

OTHER PUBLICATIONS

Vogelsang, S. et al.: "Transport of Layer 2 Frames Over MPLS". Internet draft, draft-martini-l2circuit-trans-mpls-09.txt, Network Working Group Internet Draft, Expiration Date, Oct. 2002, dated Apr. 2002. retrieved from , http://www.ieft.org/ietf/1id-abstracts.txt.

*Primary Examiner*—Tilahun Gesesse
*Assistant Examiner*—Tan Trinh
(74) *Attorney, Agent, or Firm*—Matthew J. Hodulik

(57) ABSTRACT

The present invention sets forth a methodology for providing improved downlink backhaul services from a radio network controller (RNC) to a plurality of base stations via a backhaul network that provides Ethernet services. The Ethernet services are provided by a group of provider edge (PE) switches and regular label switch routers (referred to as P switches). Base stations within the network are assigned into clusters, each of the clusters having a cluster ID. The RNC transmits packets to a given switch or switches out on the network based on a cluster ID included within the transmitted packet. The communications traffic is then multicast from at least one last hop switch in the network to candidate base stations on the basis of the cluster ID and an active set within the cluster. Advantageously, the clusters act as subgroups for more easily directing the transmission of the backhaul multicast traffic. Significant advantages are realized through use of the present invention, including the ability to allow faster and smoother handoffs, as well as backhaul bandwidth savings since intelligence regarding cell switching is extended out at a point farther along the network than was previously enabled.

26 Claims, 3 Drawing Sheets

U.S. PATENT DOCUMENTS

| | | | |
|---|---|---|---|
| 2003/0054812 A1* | 3/2003 | Hunzinger | 455/423 |
| 2003/0117966 A1* | 6/2003 | Chen | 370/255 |
| 2003/0161281 A1* | 8/2003 | Dulin et al. | 370/328 |
| 2004/0073683 A1* | 4/2004 | Beck et al. | 709/227 |
| 2004/0266457 A1* | 12/2004 | Dupray | 455/456.5 |

* cited by examiner

BACKHAUL MULTICASTING USING ETHERNET-BASED RADIO ACCESS NETWORKS

FIELD OF THE INVENTION

The present invention relates generally to wireless communications networks and, more particularly, to Fourth Generation (4G) radio access networks.

BACKGROUND OF THE INVENTION

Referring to FIGS. 1, 2 and 3, there are shown exemplary block diagrams of radio access networks for three different wireless technologies. FIG. 1 shows a UMTS (universal mobile telephone system) network 10 where user equipment 12, depending on location, wirelessly communicates with one of two base transmitting stations 14. The base stations, in turn, communicate with a radio network controller/base station controller (RNC/BSC) 16. The RNC/BSC communicates with a serving GPRS support node (SGSN) 18 which communicates to a gateway GPRS support node (GGSN) 19. FIG. 2 shows a CDMA 2000 (also referred to as 3G1X) network 20 where user equipment 22 communicates with either a first or second base station 24. The base stations communicate with a base station controller/packet control function (PCF) device 26 which in turn communicates with a packet data serving node (PDSN) 28. FIG. 3, in a similar fashion to FIG. 2 shows an HDR (high data rate) network 30 in which user equipment UE1 32 may communicate with one of several base stations 34. The base stations 34 communicate to a BSC/PCF 36 which in turn communicates to a PDSN 38.

In current releases, the 3G1X backhaul (between BTS and RNC/BSC) network is based either on Frame Relay or ATM technology. An HDR backhaul network is based on IP technology over HDLC over narrowband links like T1/E1. For R99, UMTS a backhaul network is based on ATM technology.

Since the airlink capacity is improving in future releases e.g. for UMTS R99, the airlink capacity is approximately 1 Mbps per sector, but with HSDPA, capacity can reach up to 10 Mbps and there is a push to integrate 3G networks with WLAN networks. That is, there is interest in seeing an IP-based Radio Access Network and exploring the possibility of carrying backhaul traffic over metro-Ethernets. There are, however, additional requirements to reduce the packet loss during handoff or cell switching by deploying some multicast mechanisms.

As would be understood by a person skilled in the art, in HDR, there is no concept of a downlink soft-handoff as in 3G1X and UMTS. However, in HDR, the UE is allowed to switch from one BTS to another depending on the airlink quality. UE1 32, as shown in FIG. 3, will send signals to BTSs 34 within a given proximity to inform them which specific BTS it wants to communicate with at any particular time. This is referred to as HDR cell switching. The target BTS then informs the RNC when UE1 has chosen to communicate with it. Since there is typically a communications delay between BTS and BSC (about 20–40 ms round trip), this means UE1 can only switch from one BTS1 to BTS2, after approximately 50–100 ms round trip delay.

If a BSC can multicast UE bound traffic to two or more base stations in the neighborhood of UE1, and UE1 can inform the target BTS of the next radio link frame number it expects, then it is possible to have a faster response time for HDR cell switching. Without a native layer2 multicast service, however, one has to resort to higher layers, such as Layer 3 IPMulticast, to provide such a multicast feature, which is not as efficient. Accordingly, there is a need to provide a more efficient methodology for multicasting to desired sets of BTSs.

SUMMARY OF THE INVENTION

The present invention sets forth a methodology for providing improved downlink backhaul services from a radio network controller (RNC) to a plurality of base stations via a backhaul network that provides Ethernet services. The Ethernet services are provided by a group of provider edge (PE) switches and regular label switch routers (referred to as P switches). Base stations within the network are assigned into clusters, each of the clusters having a cluster ID. The RNC transmits packets to a given switch or switches out on the network based on a cluster ID included within the transmitted packet. The communications traffic is then multicast from at least one last hop switch in the network to candidate base stations on the basis of the cluster ID and an active set within the cluster. Advantageously, the clusters act as subgroups for more easily directing the transmission of the backhaul multicast traffic. Significant advantages are realized through use of the present invention, including the ability to allow faster and smoother handoffs, as well as backhaul bandwidth savings since intelligence regarding cell switching is extended out at a point farther along the network than was previously enabled.

BRIEF DESCRIPTION OF THE DRAWINGS

A more complete understanding of the present invention may be obtained from consideration of the following detailed description of the invention in conjunction with the drawings, with like elements referenced with like references, in which.

DETAILED DESCRIPTION

The present invention sets forth the use of layer 2 Ethernet multicast services for use in a new backhaul solution for a radio access network, e.g., HDR or 4G wireless networks. With the availability of layer 2 Ethernet multicast services, backhaul transmissions can be simplified. It should be noted that this multicast feature is intended to support communications between the BTSs (base transmitting stations) and the BSC (base station controllers) as part of the backhaul network infrastructure, and is not intended to be used to support IP multicast between UE and other hosts. Also, although the invention is described with respect to HDR systems, it would be understood that the principles of the present invention are equally applicable to other wireless technologies, including for example HSDPA (a 3 GPP UMTS Release 5 feature) [TR25.855], 3G1x and UMTS [TR23.1011].

A first aspect of the present invention, is that the base stations (BTSs) of a network employing the invention are grouped in different clusters, typically based on their geographical locations but other criteria may also be possible. As will be explained in greater detail, the clusters act as subgroups for more easily directing the transmission of the backhaul multicast traffic. Each cluster is assigned a cluster identifier, for example, of 2-bytes, which is referred to as a Cluster ID (CLID). A BTS can belong to multiple clusters.

As mentioned, the invention is used as part of the backhaul network infrastructure to deliver packets to a set of neighbor lists that a UE supports. A neighbor list is a set of BTSs from which a UE can receive strong signals. An active set (subset of neighbor list) is a set of BTSs that a radio network controller (RNC) has instructed the UE to correspond to during the soft handoff scenario.

Figure 1:
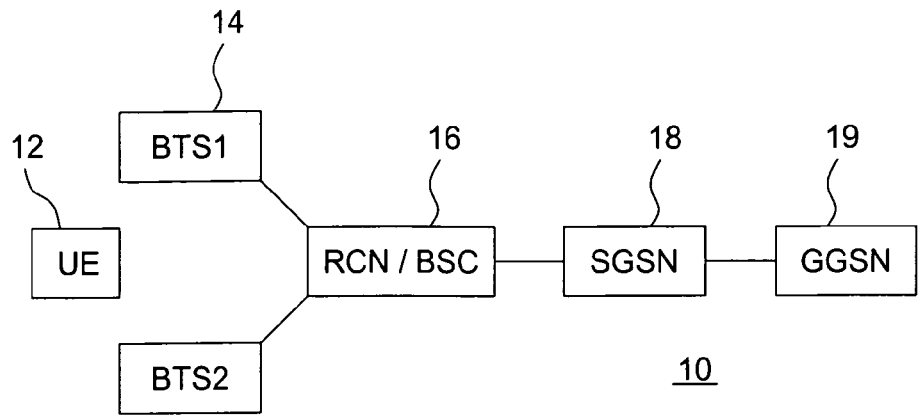
FIG. 1 is an exemplary representation of a UMTS wireless network.
Figure 2:
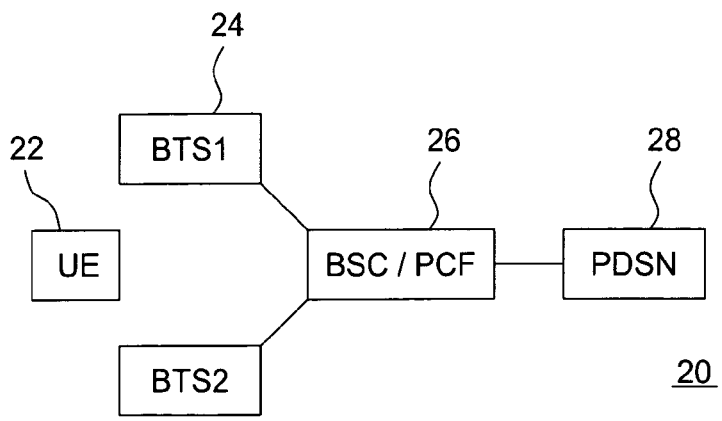
FIG. 2 is an exemplary representation of a CDMA2000 wireless network.
Figure 3:
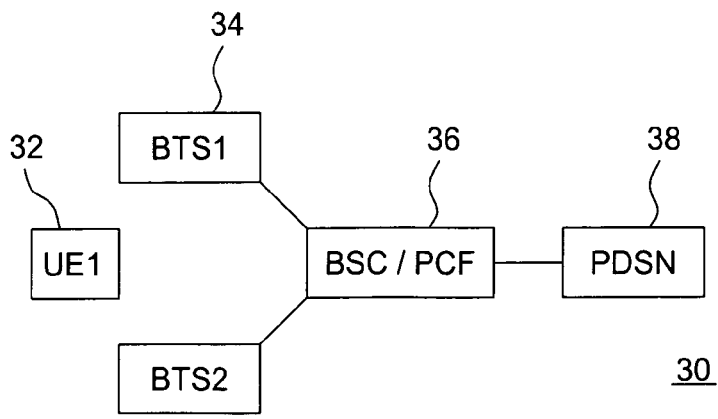
FIG. 3 is an exemplary representation of a HDR wireless network.
Figure 4:
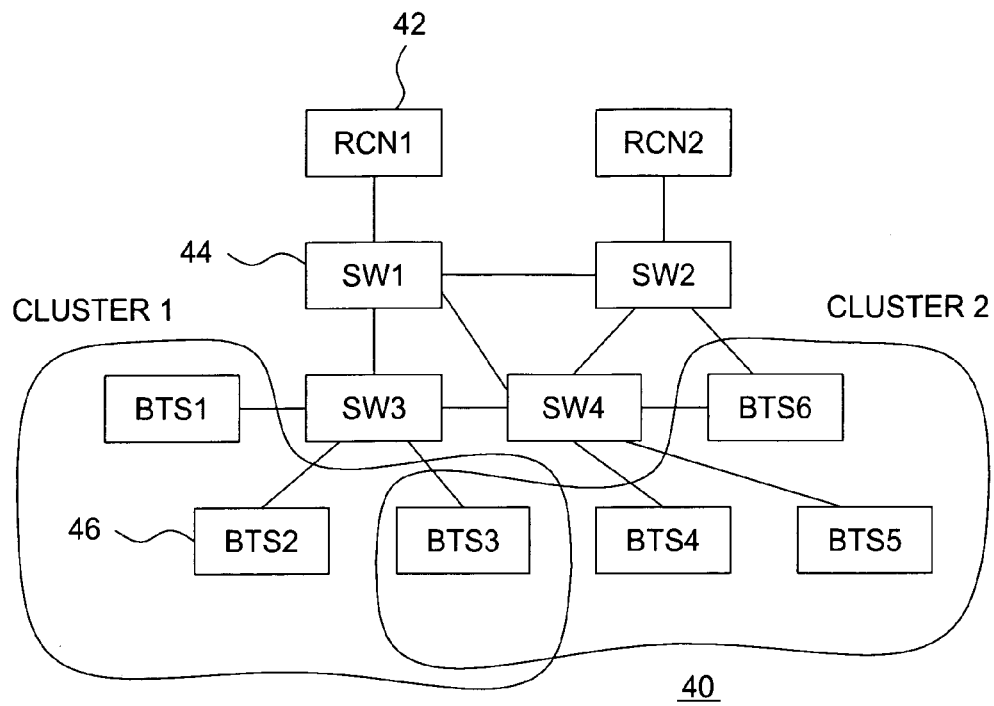
FIG. 4 is an exemplary representation of an Ethernet based radio access network in accordance with the present invention.

In accordance with the present invention, FIG. 4 shows an exemplary Ethernet based Radio Access Network 40 having two clusters. The network includes two radio network controllers (RNCs) 42 (illustratively, RNC1, RNC2), four Ethernet switches 44 (illustratively, SW1–SW4), and six base transmitting stations 46 (illustratively, BTS1–BTS6). As shown, BTS1, BTS2, and BTS3 are located in Cluster1, and BTS3, BTS4, BTS5, BTS6 are located in Cluster2. Thus, BTS3 is included in both Cluster1 and Cluster2. The RNCs, e.g., RNC1, keep the information as to which cluster a UE's active set of BTSs belongs.

Using FIG. 4 as an example, assume at a time, t1, UE1's active set is initially BTS1, BTS2, BTS3 and that the serving RNC is RNC1. Then initially, at RNC1, UE1's cluster list is designated as {1(BTS1, BTS2, BTS3)}, where the first number indicates the cluster and the second number in parentheses indicates the base stations inside a cluster to which that UE communicates. If at time t2, UE1 drops BTS1 and adds BTS4, then UE1's cluster list is {1(BTS2, BTS3), 2(BTS4)}, where RNC1 now transmits into two clusters. Next, at time t3, assume that UE1's active set is {BTS3, BTS4, BTS5}. The cluster list then becomes {2(BTS3, BTS4, BTS5)} where only a single cluster need be transmitted to, since BTS3 resides in both clusters.

With regard to the above-discussed example, when downlink traffic for UE1 arrives, RNC1 sends a packet to SW1 at time t1 initially. Depending on whether RNC1 supports MPLS, the packet format for packets generated from RNC1 may differ. If MPLS is not supported, Ethernet frames carrying a special payload format are used. We assume that both RNC and SW1 understand such special Ethernet frames using at least one Ethernet header field (e.g., by using a proprietary protocol ID). In such Ethernet frames, the Ethernet header field (e.g., by using a proprietary protocol ID). In such Ethernet frames, the Ethernet header is followed by a CLID field (e.g., CLID=1), a BitMask field, a Length/CID field, and the Payload for the packet. The CLID field specifies the cluster ID and the BitMask field specific which member (BTS) within a cluster needs to pick up the specific packet. If RNC1 supports MPLS, MPLS frames are used. The format of the MPLS frames is similar to the format of the Ethernet frames, except that an MPLS label is inserted.

Note that the above Ethernet and MPLS packet formats make use of the Cluster ID/BitMask field. An exemplary expanded representation of the Cluster ID/BitMask field may include a two-byte Cluster ID/BitMask (e.g., a two-byte format including the following bit positions Xyyyyyyyzzzzzzzz). In the exemplary representation, the most significant bit of the ClusterID, X, is a continuation bit. If this bit is set, it indicates that there are more cluster ID/BitMask fields to follow. If this bit is clear, this indicates that the next word will be the payload. As discussed, the CLID will specify the cluster ID and the BitMask will specify which member (BTS) within that cluster needs to pick up this packet.

For the rest of the example, it is assumed that RNC1 supports MPLS without loss of generality. Note that a special range of MPLS labels needs to be used to give the switches an understanding that MPLS frames for specific LSPs carry specially formatted packets (i.e. they carry CLID and BitMask). The switches that support this new protocol can use the LDP (label distribution protocol) enhancement proposed in Martini IETF draft [Martini IETF draft, l2 circuit-trans-mpls-09.txt, www.ietf.org the contents of which are incorporated by reference herein] to negotiate for setting up such LSPs. A new FEC is defined to support the new formatted packets (with CLID/BitMask).

The packet format generated by SW1 may include a Tunnel Label field, a CLID field (e.g., CLID=1), a BitMask field, a Length/CID field, and the Payload for the packet. In this case, the Tunnel Label field (e.g., having a label x) would indicate a LSP between SW1 and SW3.

At time t2, RNC1 will send a packet to SW1 destined for Clusters 1 and 2. One possible packet format assuming RNC1 supports MPLS may include a Tunnel Label field, a first CLID field (e.g., CLID=1), a first BitMask field, a second CLID field (e.g., CLID=2), a second BitMask field, a Length/CID field, and the Payload for the packet. In this case, a Tunnel Label z (for a LSP tunnel between RNC1 and SW1) is included where z is a label within a special range that indicates subsequent bytes contain information regarding CLIDs. Although described as including two pairs of CLID/BitMask fields, label range field z is followed by one or more pairs of CLID/BitMask fields.

With regard to transmissions at time t2, it is assumed that SW1 knows that to reach CLID=1, SW1 needs to send a packet to SW3 and to reach CLID=2, SW1 needs to send a packet to SW4. Thus, SW1 will generate 2 packets, one for SW3 and one for SW4. The first packet generated by SW1 for SW3 may include a Tunnel Label field (e.g., x), a CLID field (e.g., CLID=1), a BitMask field, a Length/CID field, and a Payload field. The second packet generated by SW1 for SW4 may include a Tunnel Label field (e.g., y), a CLID field (e.g., CLID=2), a BitMask field, a Length/CID field, and a Payload field.

At time t3, RNC1 only needs to send a packet destined for Cluster2 since BTS3 is a member of both Cluster1 and Cluster2. As would be understood, the RNC would be required to have some intelligence, e.g., have a processor/other hardware executing code, to be able to reduce the number of clusters involved, when appropriate. Since a RNC knows the membership of each cluster and the active set of that UE, this can be easily done, e.g., by RNC maintaining a BTS/clusters table. Based on the active set information, RNC can generate a cluster set for an active UE. Before including a new cluster id into this cluster set, RNC checks whether the next BTS in the active set belongs to any of the cluster ids already included in the cluster set. For uplink, the use of the multicast transport feature is not required.

As can be seen, significant advantages are realized through use of the present invention, including the ability to allow faster and smoother handoffs, as well as backhaul bandwidth savings since intelligence regarding cell switching is extended out at a point farther along the network than was previously enabled.

Cluster Formation

Figure 5:
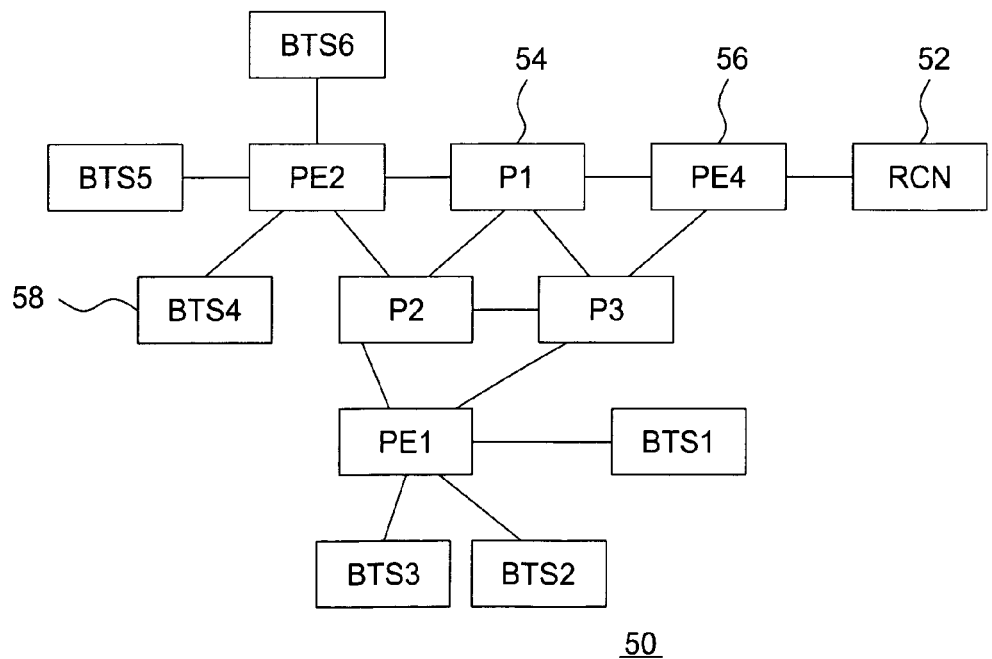
FIG. 5 shows an exemplary wireless network configuration.

As discussed, utilization of the present invention requires formations of various clusters. FIG. 5 shows an exemplary network made up of a single RNC 52, multiple switches P 54, provider edge (PE) switches 56, and base stations (BTSs) which will be referenced to illustrate cluster formation concepts of the invention. Note that with regard to FIG. 4, it was assumed that the switches in FIG. 4 include Provider Edge (PE) switch functionalities. Note that those switches in the provider's network that do not communicate to customer equipment (e.g. BTSes, RNC) are referred to as P switches in FIG. 5. P switches are regular Label Switch routers. With regard to FIG. 5, the provider edge switches are referred to as PEs rather than switches SW.

Part of the cluster formation will take place during initial BTS installation or at network configuration. In one embodiment of the invention, when a new BTS is installed, BTS 58 can send a cluster-id request message to an applicable RNC 52. The cluster-id request message contains longitude/latitude of the BTS location. The RNC 52 sends a reply message to inform the BTS of the BTS clusters (ClusterIds) to which it should belong. Referring to FIG. 5, the RNC 52 can update PE4 56 of the membership of each cluster either periodically or event-triggered. The PEs 56 will exchange information regarding cluster membership. Some keep alive messages may be sent to ensure that when a BTS 58 fails, its membership can be removed from the relevant BTS clusters.

At the end of the initial network configuration, the BTSs 58 have a record or have access to a record of what Cluster IDs to use to send/receive frames. PEs 56 also have a record or have access to a record of the members of the various Clusters. Alternatively, BTSs 58 can exchange power-up registration messages with their nearby or nearest PEs 56. The PEs 56 will then exchange membership information among themselves. A RNC 52 will learn about such membership from its nearby or nearest PE 56 . The PEs 56 may use membership exchange messages to solicit new labels.

Grouping of BTSes

There are two predominate methods in which an RNC can decide how it wants to group the BTSs into different clusters, namely offline analysis/grouping and online dynamic grouping.

For the offline analysis/grouping approach, a system administrator can analyze the active sets of mobile hosts served by BTSes within a certain geographical area and group the cells such that the packet duplication can be minimized. For an example, it may be true that a BTS and its first or second tier neighbors can be grouped into the same cluster. If a BTS and its first tier neighbors are grouped into one cluster and one BTS is allowed to be in multiple clusters, then a BTS may potentially belong to at most 7 clusters assuming hexagonal cell structure. Once the clustering decision is made, the RNC can generate such information and send it to the PEs. The PEs can exchange messages to learn about the membership for each cluster.

For the online dynamic grouping, a RNC can dynamically modify group membership of each cluster. In an extreme case, the RNC can assign one cluster to the primary cell of each active UE and the first/second tier neighbors of that cell. Whenever that UE terminates the service, the assigned clusterId is reclaimed. This may, however, generate huge amount of signaling messages between PEs for cluster membership changes. The routes for delivering cluster traffic also change very fast. One can also start with some offline grouping and then adjust some of the grouping dynamically.

New Addition/Deletion of BTSes

When a RNC doesn't receive keep-alive messages from a BTS for a period of time, a RNC assumes that the relevant BTS is not operating and can send membership update information to the closest PE. The PEs will exchange membership information. Alternatively, a more distributed approach can be utilized where BTSes exchange keep-alive messages with their nearest PEs. When PE does not receive a keep-alive message from a BTS, it will send some membership update messages to other PEs. Similarly, when PE notices a new BTS has been added, PE will send membership update information to other PEs. RNC will gather the membership changes from its nearest PE.

New Processing Rule Required for PE

As introduced earlier, it is assumed that tunnel labels within a particular range are used for the enhanced protocol of the invention. This range of labels is referred to as the multicast range.

The PEs will be required to support additional functionalities when the tunnel labels are within the multicast range, for example:

a) when a PE receives membership addition/deletion messages, the PE knows how to update its routing table so that when it receives a packet for a particular cluster, it will know how many packets to be duplicated and which interface to route such duplicated packets to.

b) When a PE receives a packet with a tunnel label that falls into "multicast range", it knows how to look at the first bit of the cluster ID to decide if there are more cluster IDs following.

c) The last hop PE should look at the bitmask to decide if it should send that packet to a certain interface by checking its cluster membership table. The last hop PE can multiplex multiple voice payloads into the same Ethernet frame to reduce last mile bandwidth usage.

An exemplary routing table and membership table kept at PE4 56 for the exemplary network of FIG. 5 is depicted as Table 1 below.

| ClusterID | NextHop    | ClusterID | Membership       |
|-----------|------------|-----------|------------------|
| 1         | LSP1       | 1         | BTS4, BTS5, BTS6 |
| 2         | LSP1, LSP2 | 2         | BTS2, BTS3, BTS4 |
| 3         | LSP3       | 3         | BTS1, BTS2, BTS3 |

In Table 1, we assume that LSP1 is set up between PE4 and PE2 to carry Cluster1 traffic, LSP21 is set up between PE4 and PE2 to carry Cluster2 traffic and LSP22 is set up between PE4 and PE1 to carry Cluster2 traffic, and LSP3 is set up between PE4 and PE1 to carry Cluster3 traffic. As illustrated in Table 1, for example, when PE4 receives a packet for Cluster1, it knows that it only needs to send a packet to the interface that talks to PE2 using LSP1.

Figure 6:
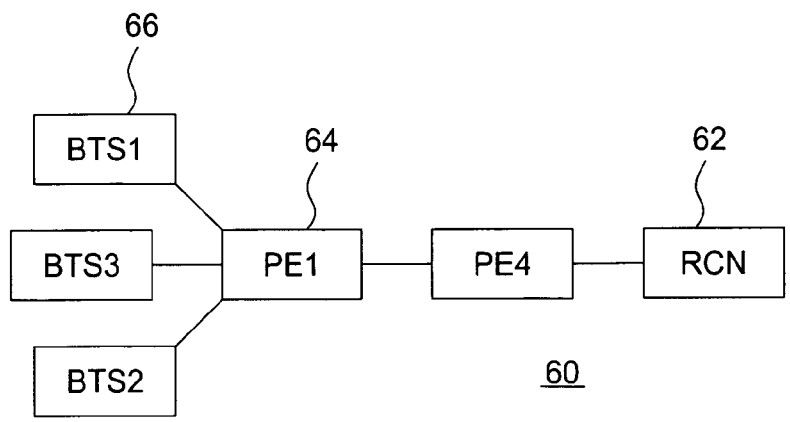
FIG. 6 shows an exemplary wireless network configuration.

Some bearer plane transport scenarios are now considered with the respect to implementation of the present invention. FIG. 6 shows a simple single cluster network 60 having a single RNC 62, two PE switches 64 and three base stations 66. An exemplary packet format for packets generated by the RNC 62 may include a Tunnel field (e.g., gghh), a ClusterID/BitMask field (e.g., 0yyyy 11100...), a Length/CID field (e.g., 22/3355), and a Payload field. An exemplary packet format for packets generated between switches PE4 and PE1 may include a Tunnel field (e.g., ddee), a ClusterID/BitMask field (e.g., 0yyyy 11100...), a Length/CID field (e.g., 22/3355), and a Payload field. With regard to packet processing by switch PE1, PE1 looks at the ClusterID/Bitmask field of relevant incoming packets and determines how many packets need to be generated and delivered to respective BTSs.

To reduce transport overhead, RNC can then multiplex multiple voice packets into one Ethernet frame destined for BTS1 if RNC communicates with the BTSs using Ethernet frames. An exemplary Ethernet transmission between, for example, PE1 and BTS1 may include the following fields: Ethernet Source (e.g., PE1 or RNC), Ethernet Destination (e.g., BTS1), Type/Protocol ID (e.g., a two-byte field), first Length/CID (e.g., 22/3355), first Payload, second Length/CID (e.g., 12/4455), second Payload, third Length/CID (8/3033), and third Payload. A new protocol ID will be required for carrying multiplexed voice packets.

MultiCluster Scenario

Figure 7:
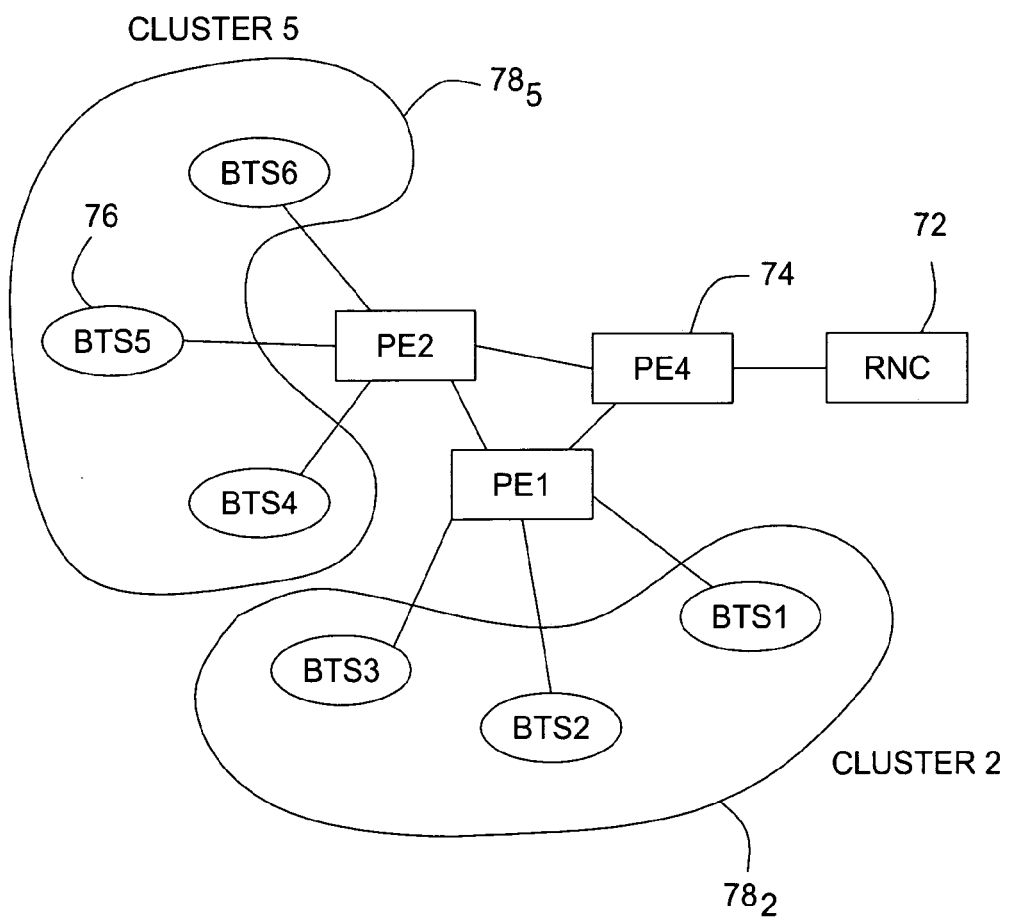
FIG. 7 is another exemplary network configuration.

FIG. 7 shows an exemplary network arrangement 70 for a multi-cluster transmission in accordance with the present invention including an RNC 72, PEs 74, and BTSs 76. As an example, assume originally, that the active set of UE1 in Cluster2 (denoted as $78_2$) is BTS1, BTS2 and BTS3. At a time later, the active set includes BTS2, BTS3 which are in Cluster2 and BTS4 which is in Cluster5 (denoted as $78_5$).

An exemplary packet generated by the RNC 72 may include a Tunnel field (e.g., gghh), a first ClusterID/BitMask field (e.g., 10010 01100...), a second ClusterID/BitMask field (e.g., 00101 10000...), a Length/CID field (22/3355), and a Payload field. Assume the PE4 routing table indicates for Cluster2 that PE1 needs to use LSP1 and forward to PE1, and for Cluster5 that LSP2 needs to be used and forwarded to PE2. Thus, PE4 generates two packets, one for PE1 and one for PE2. An exemplary packet generated by PE4 for PE1 may include a Tunnel field (e.g., ddee), a ClusterID/BitMask field (e.g., 00010 01100...), a Length/CID field (e.g., 22/3355), and a Payload field. An exemplary packet generated by PE4 for PE2 may include a Tunnel field (e.g., uuvv), a ClusterID/BitMask field (e.g., 00101 10000...), a Length/CID field (e.g., 22/3355), and a Payload field.

When the active set becomes BTS3, BTS4 and BTS5, then only Cluster5 needs to be used. The RNC includes processing intelligence to use the least number of clusters, when appropriate. The RNC sends signaling messages to those BTSs whose legs are dropped.

QoS Support

For supporting different QoS classes, we can use the existing CLS bits available in tunnel label. The PEs will need to implement different scheduling/buffer management schemes to provide different QoS requirements for different QoS classes.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of providing downlink backhaul services supporting a user equipment (UE) through a wireless network having at least one last hop switch and a plurality of base stations, said method comprising:
   grouping said base stations into clusters, each of said clusters having a cluster ID;
   grouping at least some of said base stations into an active set of base stations associated with said UE;
   grouping at least some of said cluster IDs into a cluster set associated with said UE according to said active set of base stations; and
   multicasting communications traffic from said at least one last hop switch in said network to base stations associated with said cluster set associated with said UE.

2. The method of claim 1, wherein said last hop switch is operable to interpret the received packet format and multicast the traffic to the appropriate base stations.

3. The method of claim 1, wherein a given tunnel label range within a transmitted packet indicates that a cluster ID follows.

4. The method of claim 1, wherein a flag within a packet indicates transmission of packets to multiple clusters.

5. The method of claim 1, wherein applicable switches in said network are operable to duplicate packets based on active set in a cluster.

6. The method of claim 1, wherein radio network controllers (RNC) in said network are operable to recognize that base stations may belong to multiple clusters and reduce the number of clusters an RNC needs to transmit to.

7. The method of claim 6, wherein an RNC is operable to multiplex multiple voice packets into one Ethernet frame destined for a single base station.

8. The method of claim 1, wherein said multicast transmission is an ethernet multicast transmission.

9. The method of claim 1, wherein said base stations within said network are operable to report a geographical location to a corresponding radio network controller (RNC), said RNC assigning cluster IDs to said base stations based on location.

10. The method of claim 9, wherein said base stations communicate said cluster IDs to proximate provider edge switches (PEs), said PEs exchanging cluster ID information among one another.

11. The method of claim 1, wherein a membership update methodology for clusters is selected from the group of periodic and event-triggered updates.

12. The method of claim 1, wherein keep alive messages are generated from said base stations, a radio network controller being operable to remove a base station from membership in a cluster in the absence of said keep alive messages.

13. The method of claim 1, wherein said base stations are operable to communicate keep-alive messages with proximate provider edge switches, said provider edge switches operable to provide membership updates to other provider edge switches.

14. The method of claim 1, wherein a provider edge switch upon receiving membership addition/deletion messages, is operable to update its routing table such that when it receives a packet for a particular cluster, it duplicates a correct number of packets and routes such packets to a correct interface.

15. The method of claim 1, wherein a provider edge switch looks at an indicator flag to determine if additional cluster IDs follow, when said PE receives a packet with a tunnel label that falls into a multicast range.

16. The method of claim 1, wherein a last hop switch looks to a bitmask to determine whether to send that packet to a certain interface by checking its cluster membership table.

17. The method of claim 1, wherein a last hop switch multiplexes multiple voice payloads into the same Ethernet frame to reduce last mile bandwidth usage.

18. The method of claim 1, wherein said active set of base stations is a subset of a neighbor list of base stations from which said UE can wirelessly receive strong signals.

19. The method of claim 18, wherein said subset of said neighbor list is a set of base stations which a radio network controller has instructed said UE to correspond with during a soft handoff scenario.

20. A method of providing downlink backhaul services from a radio network controller (RNC) to a wireless network having at least one last hop switch and a plurality of base stations, said base stations being assigned into clusters, each of said clusters having a cluster ID, said method comprising:

receiving packets from said RNC at said at least one last hop switch, said packets including (i) at least one cluster ID for indicating base stations in an active set of base stations associated with a user equipment (UE) to receive multicast transmissions from said last hop switch, and (ii) a continuation bit for indicating whether or not said packet includes additional cluster IDs; and multicasting communications traffic from said at least one last hop switch in said network to base stations associated with said cluster set associated with said UE on the basis of said cluster ID, said continuation bit, and any additional cluster IDs indicated by the continuation bit.

21. The method of claim 20, wherein said last hop switch is operable to interpret the received packet format and multicast the traffic to the appropriate base stations.

22. The method of claim 20, wherein a given tunnel label range within a transmitted packet indicates that a cluster ID follows.

23. The method of claim 20, wherein a flag within a packet indicates transmission of packets to multiple clusters.

24. The method of claim 20, wherein applicable switches in said network are operable to duplicate packets based on an active set in a cluster.

25. The method of claim 20, wherein radio network controllers (RNC) in said network are operable to recognize that base stations may belong to multiple clusters and reduce the number of clusters an RNC needs to transmit to.

26. A method, comprising:

grouping a plurality of base stations into clusters, each base station capable of communicating wirelessly with a user equipment;

grouping at least some of said base stations into an active set of base stations associated with said user equipment;

grouping at least some of the clusters of base stations into a cluster set associated with the user equipment based on said active set of base stations; and multicasting communications traffic to the cluster set associated with the user equipment.

* * * * *